M. HARRIS.
Draft Attachment for Plows.
No. 201,777.  Patented March 26, 1878.
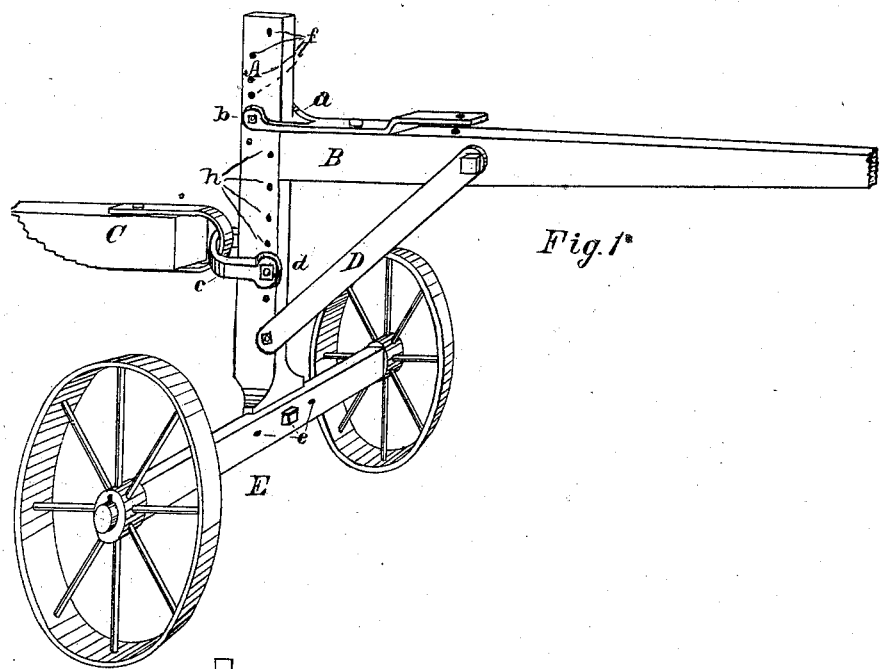
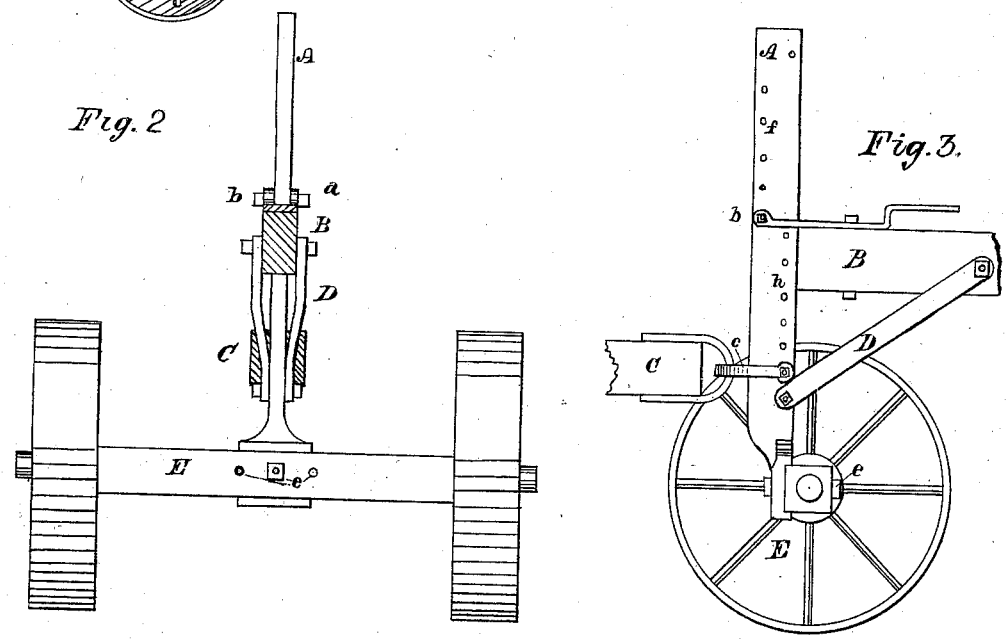
Witnesses
N. E. Thomas
L. M. Thomas
Inventor
Milo Harris

UNITED STATES PATENT OFFICE.

MILO HARRIS, OF JAMESTOWN, NEW YORK.

IMPROVEMENT IN DRAFT ATTACHMENTS FOR PLOWS.

Specification forming part of Letters Patent No. 201,777, dated March 26, 1878; application filed March 1, 1878.

*To all whom it may concern:*

Be it known that I, MILO HARRIS, of Jamestown, in the county of Chautauqua and State of New York, have invented certain new and useful Improvements in Draft Attachments for Plows, Cultivators, Harrows, &c.; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to provide plows, cultivators, and harrows with a cheap, simple, and efficient draft attachment, and one that not only lessens the labor for both team and operator, but makes the plow more portable.

My invention consists in so making, arranging, and combining a plow-truck, draft-standard, and plow-pole in front of the plow-beam that the desired object is obtained, as will be hereinafter more fully set forth.

In the drawings, Figure 1 shows the invention in perspective. Fig. 2 is an end view. Fig. 3 is a side view, in cross-section, of axle.

In the drawings, A represents the draft-standard, which is made of suitable metal, and is securely fastened at its base midway of the axle of the truck E by means of a groove or notch that passes onto the axle, both being held firmly together by a bolt passing through them. A plow-pole, B, is securely fastened to the draft-standard by the metal hammer-strap, a, which has a bolt through its center to fasten it to the pole, and one through its rear end to fasten it to the standard, while a brace, D, is fastened on the pole, and is secured to the draft-standard near its base by a bolt.

The draft-standard has a series of holes, f, to regulate the pressure on the truck-wheels, when in operation, by adjusting the pole up or down, the bolts of the hammer-strap B and brace D, fitting in different holes. It has also a series of holes, h, so the plow-beam may be set at any desired height.

The axle of the truck E is provided with holes each side its center, so as to regulate the truck for plow-beams set at different angles, the object being to always have the truck-wheels pass over the unplowed land, and not fall into the furrow.

The standard should always be midway the axle when used on cultivators and harrows.

The draft-standard is made to pass considerably above the rear of the plow-pole, and the clevis c is raised to the top hole, so as to elevate the plow-point above the ground in going to and from the field.

The draft attachment is fastened to the beam of the plow C by means of the plow-clevis and a standard-clevis, which is somewhat contracted, the object being to have them fit as closely as possible and still give the plow chance to turn easily when turning at the corners of the field.

The standard A and truck-axle E may be made cheaper by casting or welding them in one piece; but this does not allow of the adjustability desired. The team is attached the same as to a wagon.

I claim—

1. A draft attachment to operate in front of a plow-beam, consisting of the truck E, the perforated and laterally-adjustable standard A, and vertically-adjustable pole B, constructed and arranged substantially as shown and described.

2. The combination of truck E, standard A, pole B, brace D, and plow-beam C, all combined and arranged substantially as shown and described.

In testimony that I claim the foregoing as my own invention I affix my signature in presence of two witnesses.

MILO HARRIS.

Witnesses:
G. Y. AT LEE,
ROBERT H. RYAN.